United States Patent [19]

Horii et al.

[11] Patent Number: 5,246,207
[45] Date of Patent: Sep. 21, 1993

[54] WIRE INSTALLATION DEVICE

[75] Inventors: Kiyoshi Horii, Tokyo; Kakuji Ohsumi, Shimonoseki, both of Japan

[73] Assignee: Toa Kikai Kogyo Co., Ltd., Shimonoseki, Japan

[21] Appl. No.: 898,403

[22] Filed: Jun. 15, 1992

[51] Int. Cl.$^5$ .............................................. B65H 59/00
[52] U.S. Cl. ................................................. 254/134.4
[58] Field of Search ................... 254/134.4, 134.3 FT, 254/134.3 R; 137/1, 13, 808

[56] References Cited

U.S. PATENT DOCUMENTS

| | | | |
|---|---|---|---|
| 4,043,537 | 8/1977 | Russo | 254/134.4 |
| 4,684,296 | 8/1987 | Horii et al. | |
| 4,691,896 | 9/1987 | Reeve et al. | |
| 4,721,126 | 1/1988 | Horii | |
| 4,762,148 | 8/1988 | Marui et al. | |
| 4,796,970 | 1/1989 | Reeve et al. | |
| 4,969,481 | 11/1990 | Horii | |
| 5,118,226 | 6/1992 | Horii et al. | |

FOREIGN PATENT DOCUMENTS

| | | |
|---|---|---|
| 0186753 | 7/1986 | European Pat. Off. |
| 0108590 | 11/1986 | European Pat. Off. |
| 0347018 | 12/1989 | European Pat. Off. |
| 63-45508 | 3/1988 | Japan |
| 63-262339 | 10/1988 | Japan |
| 2-43505 | 2/1990 | Japan |

OTHER PUBLICATIONS

"The Rope Passing Method for Repair of Petrochemical Pipelines with Spiral Flow", Horii et al., JPI, vol. 33, No. 5, Sep. 1990, pp. 291-298.

"New Continuous System for Dispersion and Encapsulation of Submicron Powders Using Spiral Flow", Horii et al., The American Societ of Engineers, FED-vol. 100, pp. 25-30.

"A Study of Spiral Flow (Part 5) Analysis of Frictional Force Acting on Short Fiber", Horii et al., Transaction of the Japan Society for Aeronautical and Space Sciences, vol. 32, No. 98, 1990, pp. 176-183.

"A Study of Spiral Flow (Part 3) Opening and Orientation Control of Fiber by Spiral Flow", Horii et al., Transaction of the Japan Societu FPR Aeronautical Transaction and Space Sciences, vol. 32, No. 98, 1990, pp. 155-164.

"A Study of Short Fibert Transportation Using a Spiral Flow", Theorectical and Applied Mechanics, vol. 37, pp. 73-79.

Development of New Mixing Nozzle Assembly, etc., 10th International Symposium on Jet Cutting Technology, Oct. 31, 1990.

Primary Examiner—Robert C. Watson
Attorney, Agent, or Firm—Wenderoth, Lind & Ponack

[57] ABSTRACT

A Coanda spiral flow unit wire installation device having a tube passage connecting port, an inlet for a conducting wire or an induction wire, and a Coanda slit for the supply of compressed fluid to generate Coanda spiral flow in the direction of the tube passage, a compressed fluid control device which comprises a hand grip with a fluid supply passage and a compressed fluid supply valve unit provided in the hand grip. The unit is small-sized and light-weight and can be hand held so as to permit easier and more efficient wire installation in limited space situations.

1 Claim, 4 Drawing Sheets

WIRE INSTALLATION DEVICE

FIELD OF THE INVENTION

The present invention relates to a wire installation device. More particularly, the present invention relates to a wire installation device which permits easy and highly efficient installation of a wire even in a piping work for passing a wire through a thin tube having a number of bends, and even when the portion of that thin tube for insertion of the wire allows only a narrow space or is at an elevated position.

PRIOR ARTS

It has conventionally been a common practice to install a conducting wire through a small-diameter tube passage at office buildings, factories, communications facilities and private homes, and various types of installation methods for this purpose have been developed. For instance, the conventionally known installation methods include: (a) ones using compressed fluid, and (b) ones not using compressed fluid. As the former method, a method of supplying compressed fluid through a tube passage and transporting a conducting wire thereinto is known. As an example of the later method, a method of manually forcing a conducting wire with another wire is known.

In the former method, however, there is a serious restriction on the tube diameter allowing wire installation: the smaller the tube diameter, the more difficult it is to install a wire therethrough. Furthermore, since the wire is to be installed in a turbulent state of the fluid, vibration of the wire results in contact thereof with the tube inner wall, thus generating a considerable frictional force. In a tube passage having many bends, therefore, contact between the tube inner wall and the conducting wire makes it very difficult to install the wire. It is often difficult to install a wire even through a tube passage having a length of 20 m or 30 m. In the latter method, on the other hand, the conducting wire is manually forced into the tube, and accordingly, such installation of the wire is in many cases difficult. Even when one can manage to install a wire over a short distance, it requires tremendous labor.

For the purpose of overcoming these defects in the conventional method, the present inventors have already proposed a new method permitting easy and efficient wire installation even through a thin tube having many bends and an apparatus for the application thereof. This method and the apparatus are based on, as the principle, the Coanda spiral flow that the present inventors had made active efforts for the application in various fields.

The Coanda spiral flow has features that there are large differences in velocity and density between the axial flow along which a fluid flows and its surroundings, and that it shows a steeper velocity distribution, i.e., the velocity of the axial flow is high while that of the peripheral flows is low. For example, the degree of turbulence is 0.09, less than a half that for a turbulent flow of 0.2, forming a condition different from the turbulent flow. It also has a feature that a synthesis of an axial vector and a radial vector results in a peculiar spiral flow.

Using the fact that Coanda spiral flow converges along the tube axis is an in-tube flow, therefore, an apparatus for installing a wire was developed which permitted easy and efficient wire installation even through a thin tube having many bends.

FIG. 1 is a schematic view illustrating the method and the device already proposed by the present inventors.

As shown in FIG. 1, for instance, a Coanda spiral flow unit (3) is connected through, or without using, a flexible hose (2) with a prescribed tube (1) for installing a conducting wire. To this Coanda spiral flow unit (3), compressed fluid is supplied in the wire installing direction of the tube (1) through Coanda slits (4) thereof using a compressed fluid supply means (5). In this state, a prescribed conducting wire (7) is inserted into the suction port (6) of the Coanda spiral flow unit (3).

The conducting wire (7) is automatically transferred by a spiral flow in the flexible hose (2) and the tube (1), causing wire installation to proceed at a high speed under less friction with the tube wall.

As the compressed fluid supply means (5), an air compressor or a tank of a compressed fluid such as nitrogen may be utilized. Even when using a tank, it suffices to use one capable of keeping the supply pressure of compressed fluid at approximately 10 kg/cm$^2$.

A typical example of the Coanda spiral flow unit (3) is, as shown in FIG. 2, the one in which an annular Coanda slit (4), an angled surface in the close vicinity thereof (9), a distribution chamber of compressed fluid (10), and a compressed fluid supply passage (11) are provided between the connecting port (8) to a tube and the suction port (6) through which a conducting wire is introduced.

By making the angled surface (9) about 5° to 70°, a spiral flow occurs and an intense vacuum suction force is generated at the suction port (6), thereby sucking a conducting wire (7), which is installed at a high speed through the tube (1) in FIG. 1 by the Coanda spiral flow.

The foregoing wire installation method and the device therefor offer a very excellent effectiveness by permitting easy and efficient wire installation through a thin tube having many bends and installation of an optical fiber in one pass in a short period of time through a tube having a length of 500 m or even 1,000 m.

However, the foregoing wire installation method based on Coanda spiral flow and the device therefor had several points to be improved. In the case of a work site under a spatial restriction where the place of wire installation is only manually accessible or the operation at an elevated level must be accomplished on a trestle, wire installation is physically impossible with the conventional installation type device for wire installation based on Coanda spiral flow, and furthermore, on-off operations and adjustment of the supply of compressed fluid are seriously inefficient and difficult.

SUMMARY OF THE INVENTION

The present invention was developed with a view to solving the problems as described above and has an object to provide an improved wire installation device with a high degree of freedom in selecting an operating space, which permits easier and more efficient wire installation.

The present invention provides, as a means to solve the problems as described above, in a Coanda spiral flow unit wire installation device having a tube passage connecting port, an inlet for a conducting wire or an induction wire, and a Coanda slit for the supply of compressed fluid to generate Coanda spiral flow in the direction of the tube passage, a wire installation device which comprises a knob and a compressed fluid supply valve unit additionally provided and is of a small-sized and light-weight handly type.

DETAILED DESCRIPTION OF THE INVENTION

Figure 1:
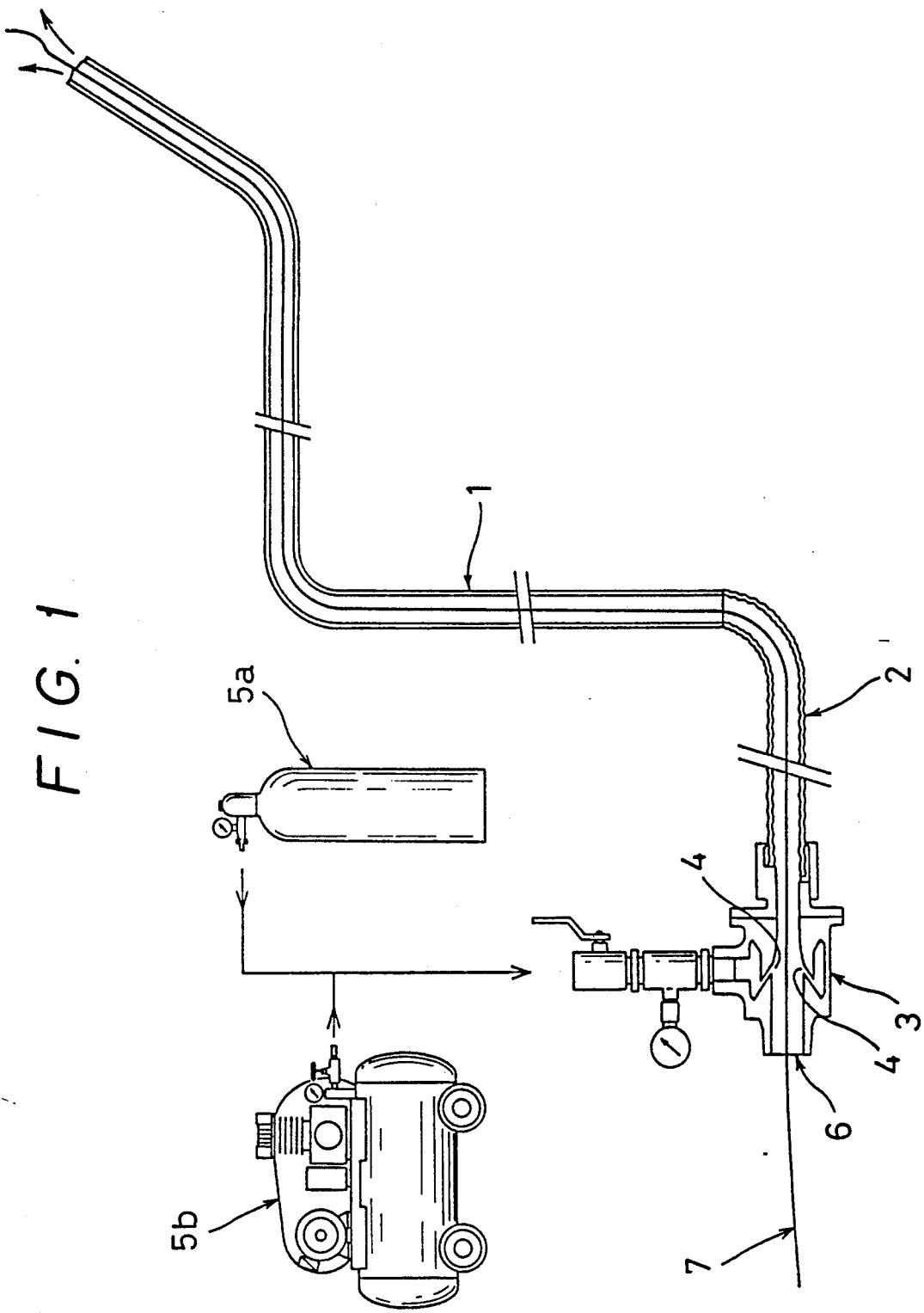
FIG. 1 is a schematic view illustrating an embodiment of the wire installation method already proposed by the present inventors.
Figure 2:
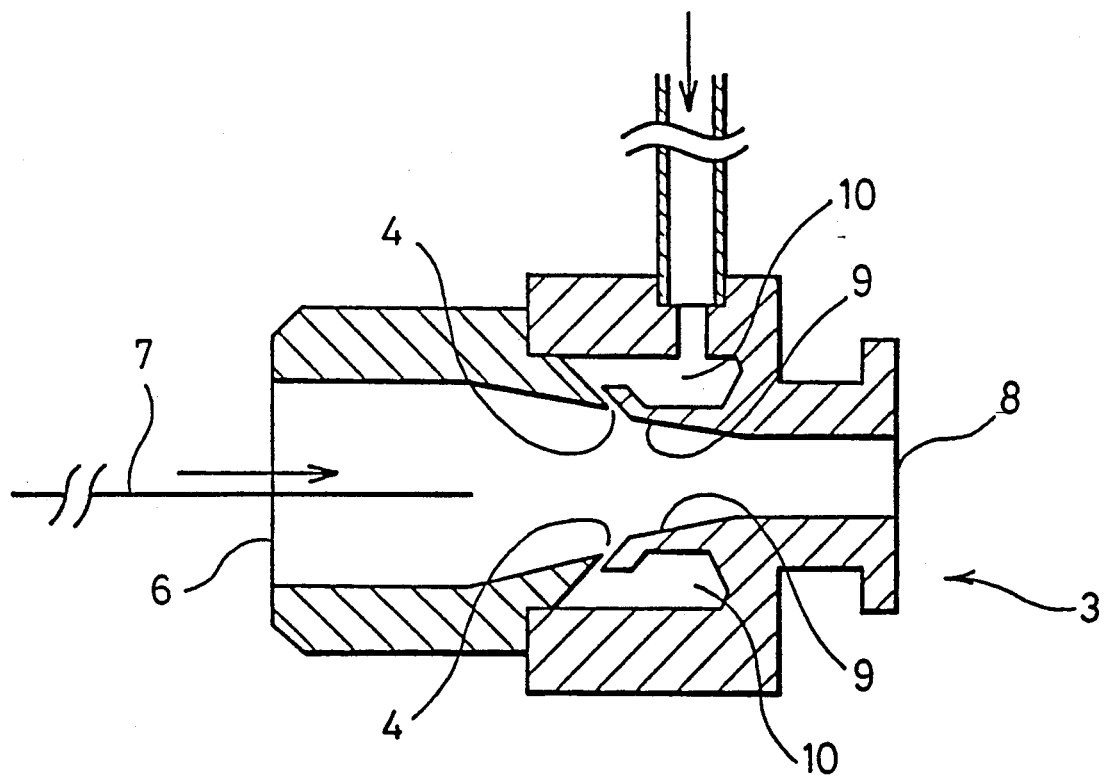
FIG. 2 is a sectional view illustrating a typical Coanda spiral flow unit applicable in the method shown in FIG. 1.

More specifically, in the present invention, easy, efficient and stable wire installation is ensured, in an apparatus as shown in FIG. 2 for example, by providing a hand grip, with a compressed fluid supply valve unit, to permit portable operation even at an operating site under a spatial restriction.

Figure 3:
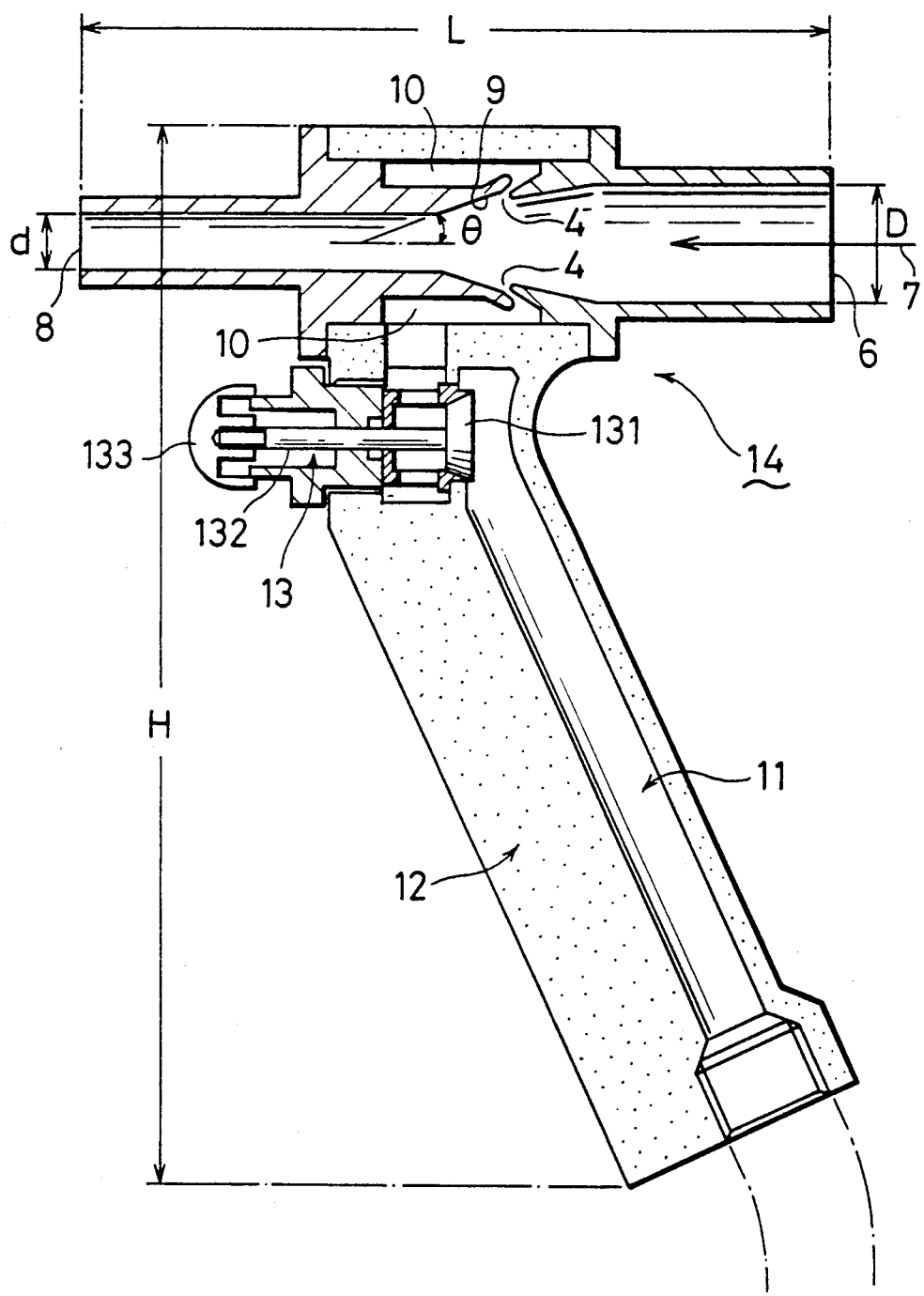
FIG. 3 is a sectional view illustrating an embodiment of the device of the present invention.
Figure 4:
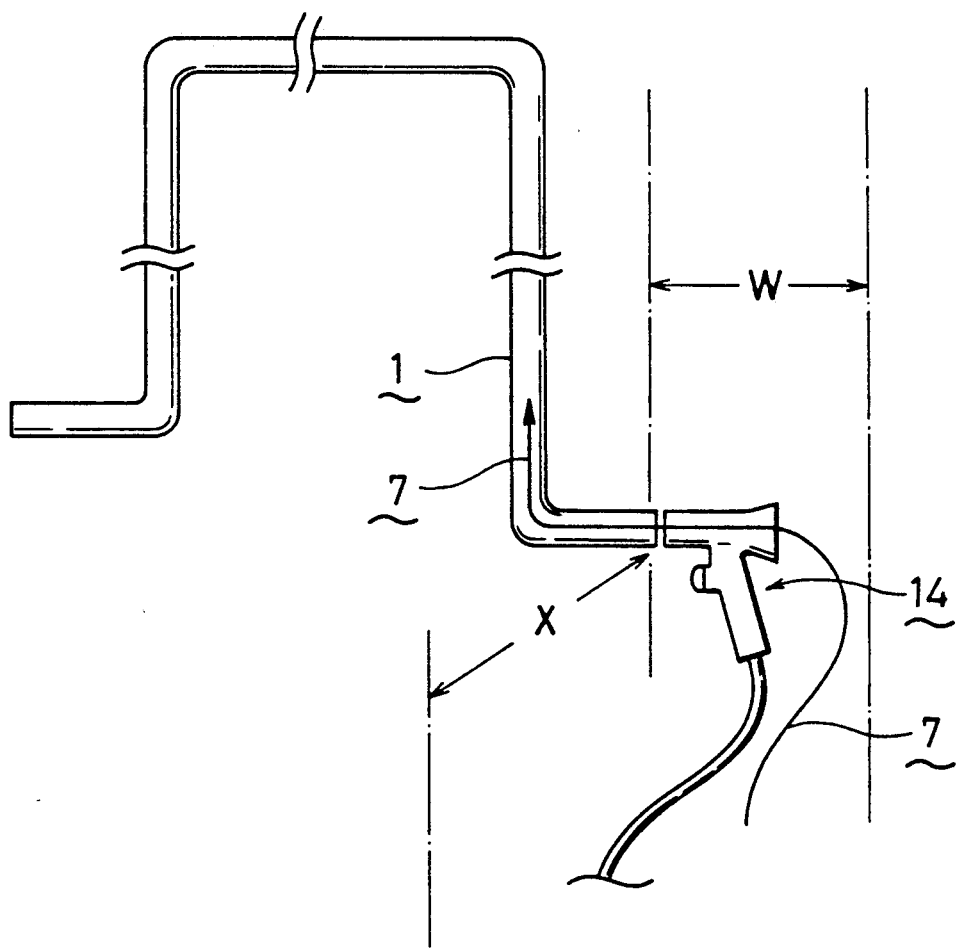
FIG. 4 is a schematic view illustrating an example of wire installation using the device of the present invention.

FIG. 3 illustrates an example of the wire installation device of the present invention. In the wire installation device of the present invention, as shown in this FIG. 3, for instance, a hand grip (12) is provided around a compressed fluid supply passage (11), and a compressed fluid supply valve unit (13) is provided at the foot of the hand grip (12), to install a conducting wire by introducing same through the suction port (6).

The compressed fluid supply valve unit (13) may be configured, as shown in FIG. 3 for example, with a valve (131) a sliding shaft (132) opening and closing this valve (131), and a pressing head (133) for pressing or releasing this sliding shaft (132).

Supply of compressed fluid to a distribution chamber (10) is switched to ON-OFF by holding the hand grip (12) and pressing the pressing head (133) with a finger, thus permitting adjustment of supply thereof.

It is needless to mention that the present invention is not limited to this configuration.

In the present invention, a groove running along the width of the finger may be provided on the hand grip (12) to facilitate holding thereof. By making the hand grip (12) expansible, it is possible to install a wire even at a place where the tube opening is not manually accessible. It is possible, by the application of the present invention as described above in detail, to obtain such effects as:

a) efficient wire installation even at a place under spatial restriction; and b) managing to supply the fluid at one's hands, thus permitting easy and efficient wire installation.

The present invention will be described further in detail below by means of examples.

EXAMPLE

Using the hand grip-type Coanda spiral flow wire installation device (14) of the present invention, an optical fiber conducting wire having a diameter of 1.8 mm was installed into a plastic tube (15) having four bends, a diameter of 8 mm and a length of 60 mm. The hand grip-type Coanda spiral flow wire installation device (14) as shown in FIG. 3 was employed. In this device, the distance (L) between the suction port (6) and the connecting port (8) was 10.3 cm; the height (H) from the upper end of the device to the lower end of the knob was 13 cm; the suction port (6) had a diameter (D) of 14.85 mm; the connecting port (8) had a diameter (d) of 4 mm; the annular Coanda slit (4) had a width of 0.2 mm; and the angled surface (9) had an angle (O) of 15°. This size is common to all hand grip-type ones. This wire installation device (14) was operated under very restricted conditions including an operating space width (W) of 20 cm and a depth (X) of 60 cm.

Compressed air under a pressure of 8 kg/cm$^2$ was supplied through this annular Coanda slit (4) to install the wire. As a result, wire installation was completed in only a few seconds.

Wire installation was attempted, on the other hand, by connecting a flexible tube to a conventional wire installation device generating ordinary turbulence, but it was impossible to install the wire. In the installation-type Coanda spiral flow wire installation device already proposed by the present inventors, furthermore, it was possible to install a wire by connecting a flexible tube, but this gave only a poor operating efficiency.

By the application of the present invention, as is clear from the above description, wire installation can be very easily achieved even under spatial restriction.

What is claimed is:

1. A small size, light weight, hand held Coanda spiral flow wire installation device, comprising:

a Coanda spiral flow unit having a unit body, a Coanda spiral flow passage through said body and having a tube passage connection port at a downstream end and an inlet port for a conducting wire or an induction wire at an upstream end, and a Coanda slit around said passage and open into said passage for supplying compressed gas to said passage for generating a Coanda spiral flow in the direction of said flow passage;

said unit body having a hand grip thereon and having a compressed fluid supply passage therethrough from outside said device and extending to said Coanda slit; and a finger operated supply valve in said hand grip and valving said fluid supply passage.

* * * * *